Jan. 12, 1965 K. EASTERDAY 3,165,189
DISPENSER OPERABLE IN RESPONSE TO MOVEMENT OF A VEHICLE
Filed Oct. 29, 1963 3 Sheets-Sheet 1
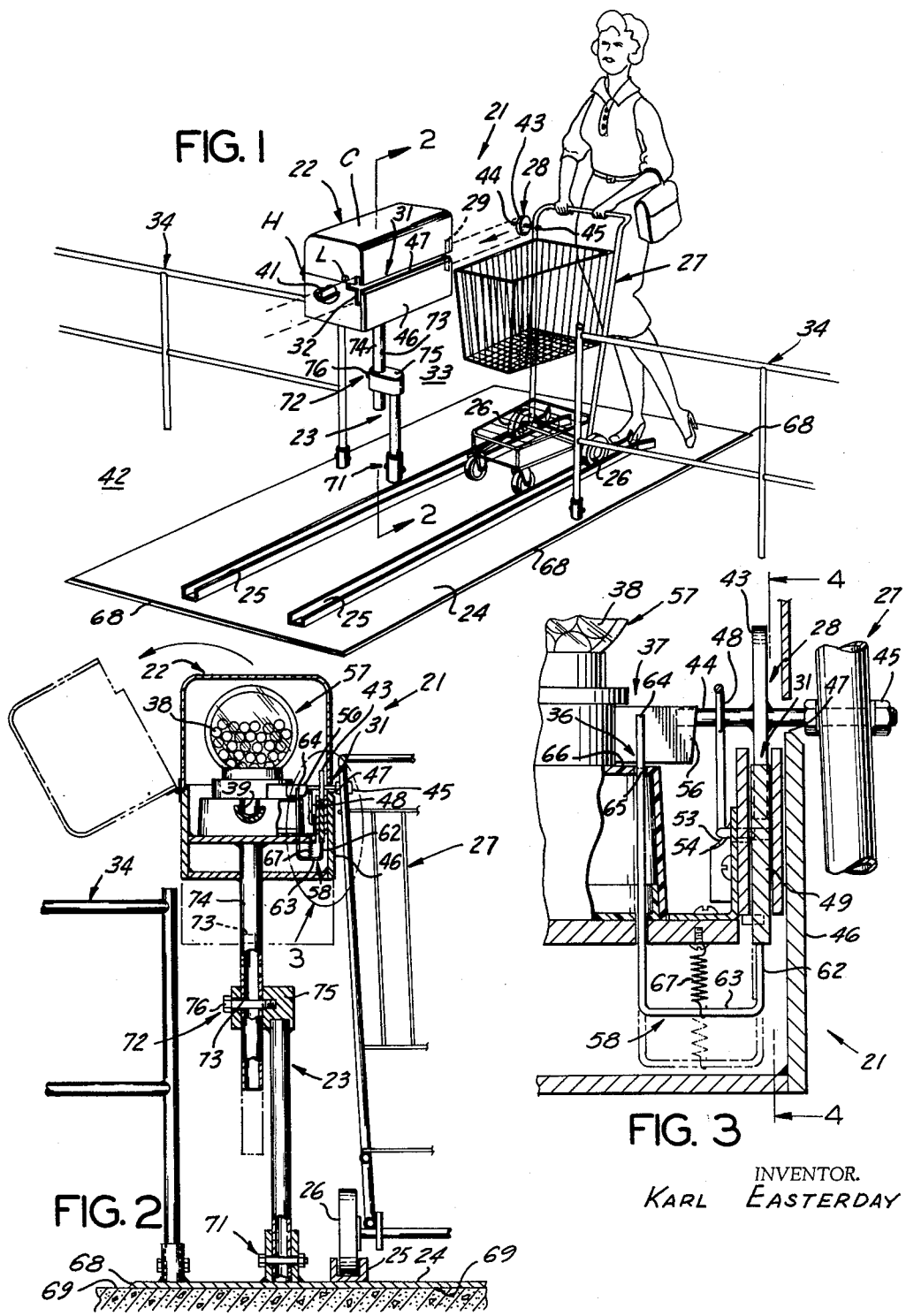
INVENTOR.
KARL EASTERDAY

INVENTOR.
KARL EASTERDAY

Jan. 12, 1965 K. EASTERDAY 3,165,189
DISPENSER OPERABLE IN RESPONSE TO MOVEMENT OF A VEHICLE
Filed Oct. 29, 1963 3 Sheets-Sheet 3
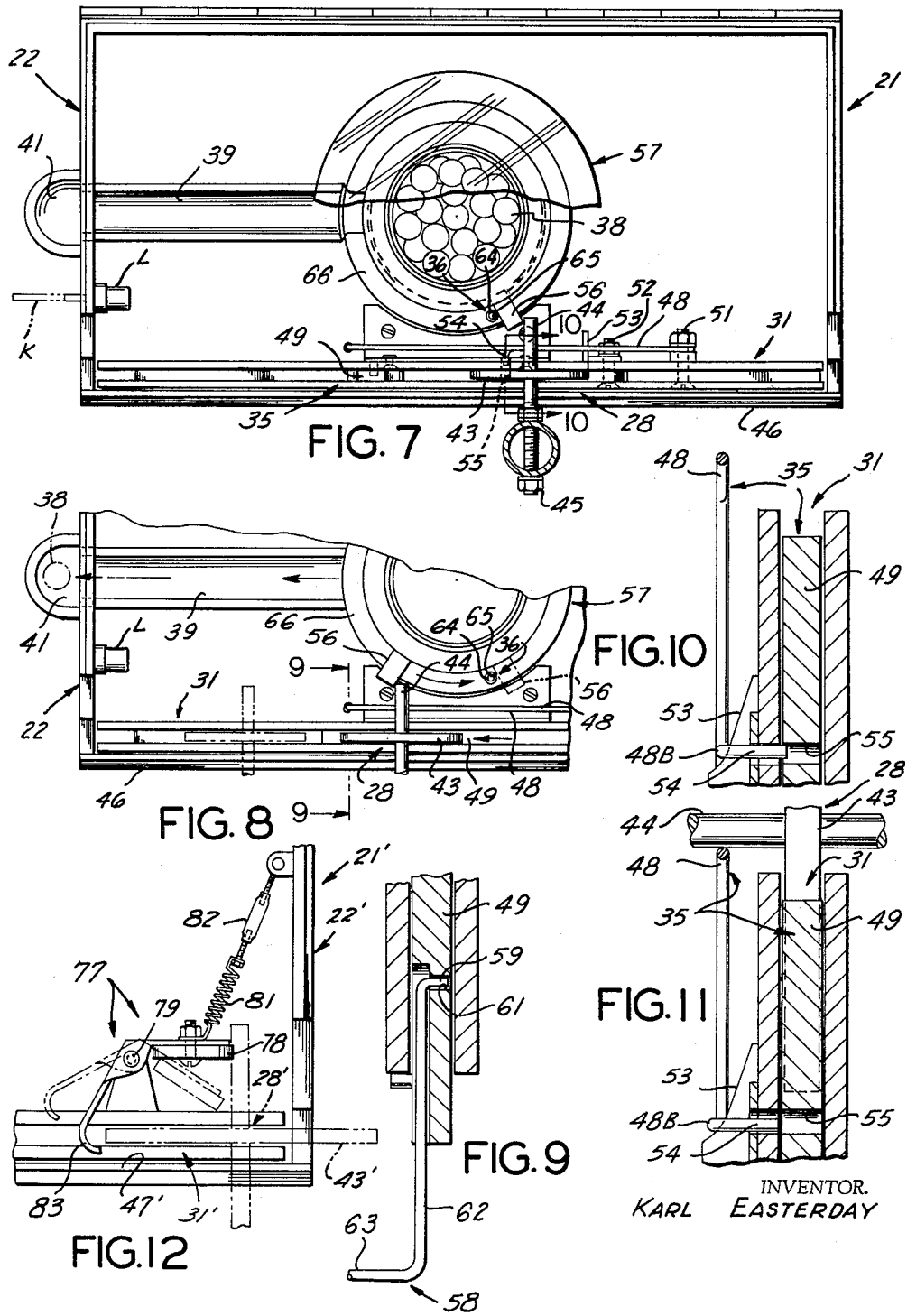
INVENTOR.
KARL EASTERDAY

United States Patent Office 3,165,189
Patented Jan. 12, 1965

3,165,189
DISPENSER OPERABLE IN RESPONSE TO
MOVEMENT OF A VEHICLE
Karl Easterday, 157 N. Shattuck Place, Orange, Calif.
Filed Oct. 29, 1963, Ser. No. 319,877
15 Claims. (Cl. 194—4)

Generally speaking, the present invention relates to a dispenser operable in response to the movement of a vehicle. More particularly, in one preferred exemplary form of the invention, the vehicle adapted to bring about operation of the dispenser may comprise a shopping cart of the kind conventionally used by shoppers at markets and the like and may be arranged for operation of a gift dispenser when said shopping cart is controllably moved past said gift dispenser into a storing region or station where a shopping cart is to be stored after use by a shopper.

In other words, the preferred form of the invention is intended to insure the return of the relatively expensive shopping carts to a selected shopping cart storing region or station so that the grocery store, market, or shopping center will not have the problem, which now exists, of losing a considerable number of shopping carts or of finding them, often after extensive searching, at locations relatively remote from the store.

At the present time, such remote retrieval and, in certain cases, loss of such shopping carts by a market or store presents a major problem since the carts are quite costly, as is the cost of searching for lost carts. However, if some incentive is provided for a shopper, or for the shopper's children, to return the empty shopping cart after use to a specified shopping cart storing region or station closely adjacent to the grocery store or market, it will be found that the above-mentioned problem of remote retrieval and loss of shopping carts will be greatly reduced.

The apparatus of the present invention is, in one preferred form thereof, primarily intended for this type of use and for this purpose, and it should be understood that the invention will be described throughout this application primarily with respect to this particular aspect of the invention. However, it should be clearly understood that this is done for exemplary purposes only and is not to be construed as limiting the invention to this type of use. Actually, in a broad sense, the apparatus of the present invention may act for dispensing any desired object, or plurality of objects, in response to the movement of any vehicle or object in a selected relationship with respect thereto, and the present application is to be read in this light.

With the above points in mind, it is an object of the present invention to provide a novel dispenser appartus operable in response to a desired type of movement of a desired operating key member or means with respect thereto—said operating key member being adapted to be carried by some other object and being adapted to co-operate with the dispenser apparatus as said object is controllably moved in a selected way along all or a portion of the dispenser apparatus.

It is a further object of the present invention to provide a dispenser apparatus of the character referred to hereinbefore which is operable in response to longitudinal movement of a vehicle in a selected manner and at a selected location with respect thereto.

It is a further object of the present invention to provide dispenser apparatus of the character referred to hereinbefore which is operable in response to the longitudinal movement therealong of a shopping cart in a selected position and relationshp with respect to the dispenser apparatus as said shopping cart is moved into a shopping cart return, reception, and/or storing region, station, or location.

It is a further object of the present invention to provide a particular (or first) apparatus of the character referred to hereinbefore, which is capable of being operated only by a particular set of shopping carts owned by, or used by, a particular market or store, while other shopping carts in the same region owned by, or used by, another market or store will not be capable of operating said particular (or first) dispenser apparatus. Another (or second) dispenser apparatus can be adapted to be operated by another (or a second) set of shopping carts only, if desired. In other words, the apparatus can be selectively rendered operable by any selected one of several different sets of shopping carts and would be effectively inoperable by any of the other sets of shopping carts and this can be initially selected at the time of installation of the apparatus or can be subsequently modified as desired by the store management.

It is a further object of the present invention to provide apparatus of the character referred to hereinbefore which is capable of being operated only upon passage therethrough of the proper type of operating key means and which will be incapable of operation by any unauthrorized operating key means or anything else.

It is a further object of the present invention to provide apparatus of the character referred to hereinbefore, including activation means which can only be activated by the proper operating key means and which then renders the rest of the dispenser apparatus operable thereby but which, upon reception of an improper unauthorized key means will not be operated and will effectively prevent the rest of the dispenser apparatus from being operated in any manner.

It is a further object of the present invention to provide apparatus of the character referred to above, in any of the various generic and/or specific forms thereof mentioned above, either individually or in combination, and which is of extremely simple, inexpensive, foolproof, structurally strong-easy-to-install, easy-to-operate, and substantially maintenance-free construction such as to be conducive to widespread use thereof.

Further objects are implicit in the detailed description which follows hereinafter (which is to be considered as exemplary of, but not specificially limiting, the invention) and said objects will be apparent to persons skilled in the art after a careful study of the detailed description which follows hereinafter.

For the purpose of clarifying the nature of the present invention two exemplary embodiments of the invention are illustrated in the hereinbelow-described figures of the accompanying three sheets of drawings and are described in detail hereinafter.

FIG. 1 is a reduced-size perspective view illustrating one exemplary embodiment of the present invention in installed relationship with respect to a shopping cart storing region or station (which is shown fragmentarily) whereby to provide an arrangement such that the passage of a returned storage cart through the entry opening and along the underlying wheel-guiding channel members will cause the operating key means to pass longitudinally through the housing means of the dispenser apparatus which will cause one ball of gum (or any other desired gift object) to be dispensed so that the person returning the shopping cart may take same as a reward for returning the shopping cart to the shopping cart storing region or station.

FIG. 2 is a larger-scale fragmentary view, partly in elevation, partly broken away, and partly in section, taken in the direction of the arrows 2—2 of FIG. 1. This view also shows the open position of the housing cover in phantom.

FIG. 3 is a larger-scale fragmentary view of the portion of FIG. 2 lying in the elliptical region indicated by the arrow 3 of FIG. 2.

Figure 4:
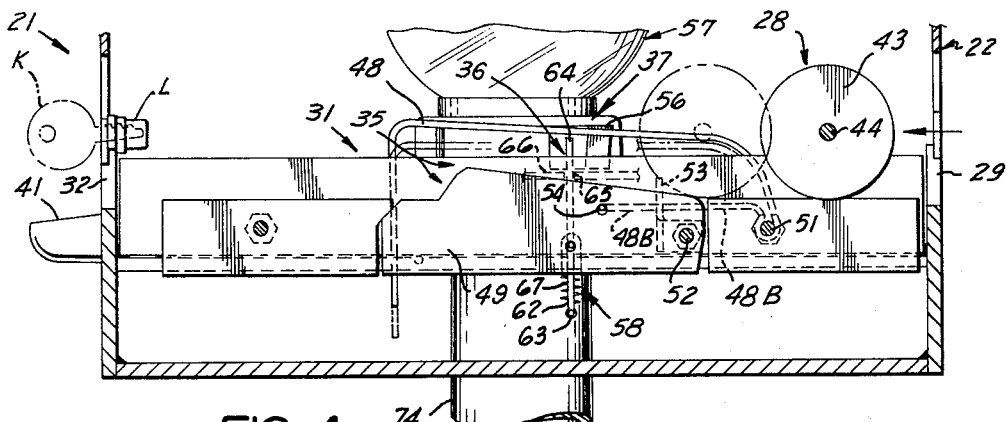

FIG. 4 is a fragmentary view, partly in elevation and partly in section, taken in the direction of the arrows 4—4 of FIG. 3. This view shows the operating key means (comprising a circular disk lying in a vertical plane and carried by a horizontal rod) after it has just entered the longitudinal track means extending through the housing from the entry aperture means shown at the right of FIG. 4 to the exit aperture means shown at the left of FIG. 4. Said operating key means is shown in solid lines after such entry and before operation of the apparatus which brings about the dispensing of a gum ball. Another subsequent position of said operating key means and certain portions of the apparatus actuated thereby are shown in phantom or broken lines also in FIG. 4.

Figure 5:
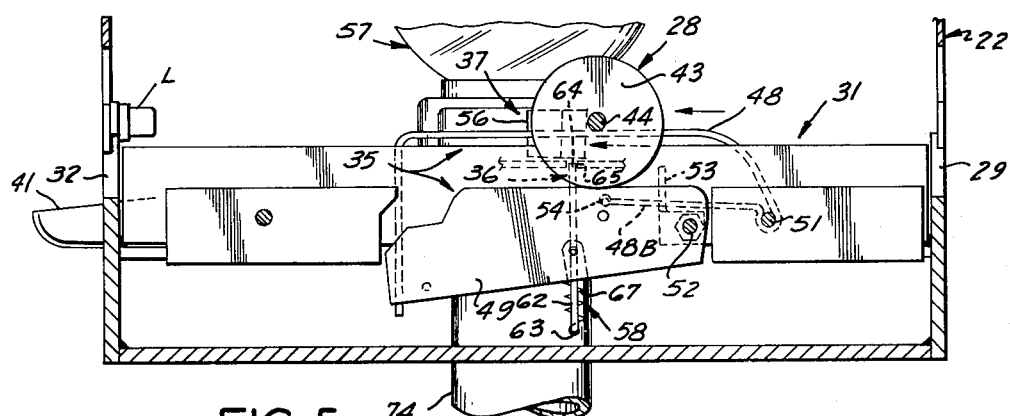

FIG. 5 is a view similar to FIG. 4, but shows the apparatus after the operating key means has moved further to the left and has proceeded with the next step in the actuation of the apparatus which brings about the dispensing of the gum ball.

Figure 6:
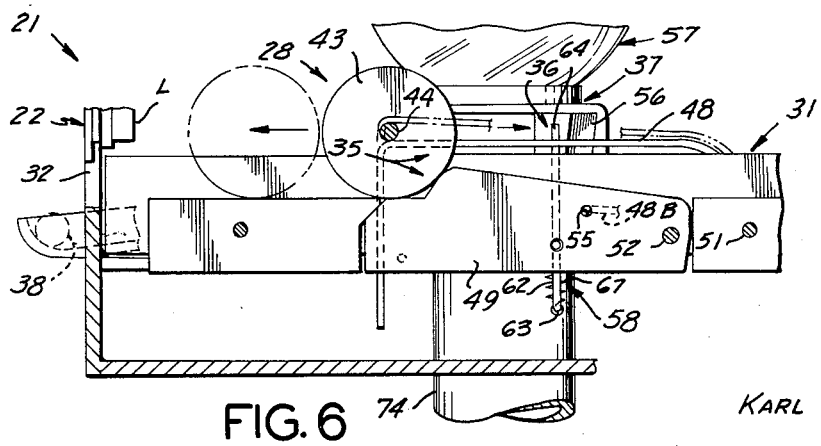

FIG. 6 is a fragmentary view generally similar to FIGS. 4 and 5, but illustrates the next sequential position of the apparatus as the operating key means is moved further toward the left whereby to bring about the actual dispensing of the above-mentioned gum ball.

FIG. 7 is a top view taken, in part, on a horizontal plane coincident with the longitudinal side slot at the near or right side of the housing as seen in FIG. 2 and with the longitudinal hinge means at the far or left side of the housing as shown in FIG. 2 and shows the apparatus in a position such as is shown in FIG. 5. However, a part of the storing means storing the gum balls and of the controllably operable dispensing means positioned thereunder are shown broken away in this view for reasons of drawing clarity.

FIG. 8 is a fragmentary top view generally similar to FIG. 7, but shows the apparatus substantially in a position such as is shown in FIG. 6 after the controllably operable dispensing means has been operated by the operating key means and has effectively caused the dispensing of a gum ball.

FIG. 9 is an enlarged fragmentary view, taken in the direction of the arrows 9—9 of FIG. 8.

FIG. 10 is an enlarged fragmentary view, taken in the direction of the arrows 10—10 of FIG. 7.

FIG. 11 is an enlarged fragmentary view similar to FIG. 10, but shows the second element of the unlocking means after the first element of said unlocking means has been controllably disengaged therefrom by the cam means so that said second element of said unlocking means can be controllably actuated by said operating key means into a lower position as is clearly shown in FIG. 5.

FIG. 12 is a fragmentary view generally similar to the lower right hand corner of FIG. 7 but illustrates a slight modification thereof wherein the apparatus is provided with magnetically operable activation and inactivation means which is normally held in an inactivating position which will prevent the unauthorized passage through the longitudinal track means of an unauthorized operating key means, but which will allow the passage through said longitudinal track means of an authorized operating key means.

Generally speaking, the first exemplary form of the invention illustrated may be said to comprise dispenser apparatus operable in response to the movement of a first object in a selected relationship with respect thereto for dispensing another object.

In the exemplary first form illustrated, said dispenser apparatus is generally designated at 21 and includes housing means, generally designated at 22, mounted by mounting standard means, indicated generally at 23, in upstanding relationship with respect to an underlying platform means 24 which carries a pair of laterally spaced longitudinal wheel-guiding channel members 25 thereon for the reception therein of the hind wheels 26 of the shopping cart indicated generally at 27.

It will be noted that the shopping cart 27 is provided with operating key means, indicated generally at 28 which is adapted to be slidably received in an entry aperture means 29 in one end of the housing means 22 and is then adapted to slide along the longitudinal track means, indicated generally at 31, within the housing 22 and is then adapted to pass out of the near end wall of the housing means 22 by way of the exit aperture means 32. This action occurs in a very precise and aligned manner by reason of the fact that the rear wheels 26 of the shopping cart 27 are precisely laterally positioned and guided during longitudinal movement of the shopping cart 27 along the U-shaped wheel-guiding channel members 25 as the shopping cart passes through the entry opening 33 in the fence 34, which is shown fragmentarily and which it should be understood is normally adapted to enclose and define a desired shopping cart storing region or station 42.

It will be noted that the above-mentioned longitudinal passage of the operating key means 28 through the entry and exit apertures 29 and 32 and along the intervening longitudinal track means 31 of the housing means 22 will effectively actuate unlocking means, generally indicated at 35, which is positioned within the housing 22 and which is effectively coupled with respect to locking means, indicated generally at 36, which normally effectively locks the controllably operable dispenser means, indicated generally at 37, so as to prevent the dispensing operation thereof and the dispensing of any one of a plurality of objects such as the gum balls 38 into a discharge chute 39 and a removal tray 41 carried at the outside of one end wall of the housing 22.

In other words, the movement of the operating key means 28 through the entry and exit aperture means 29 and 32 and along the length of the intervening track means 31 unlocks said unlocking means 35, which moves said locking means 36 into an unlocked relationship with respect to the controllably operable dispenser means 37, which is then operated in a dispensing manner by the operating key means 28, which thus causes a gum ball 38 to be dispensed into the outside positioned removal trough or tray 41 so that the person returning the shopping cart 27 to the shopping region or station, indicated by the reference numeral 42, can remove the gum ball 38 as a reward for having returned the shopping cart 27. This is the whole purpose of the invention and, in an arrangement of the type just described, it will probably be found that the children of the shopper will be most likely to return the shopping cart 27 to the shopping cart storing region or station 42 since children are quite attracted by gum balls such as those shown at 38. However, it should be clearly understood that various other gifts may be dispensed by the apparatus by any of the various well known types of dispensing apparatus operated by the novel apparatus of the present invention so as to provide the proper incentive for return of the shopping carts 27. In certain cases trading stamps or other objects may be dispensed rather than food objects. In fact, any desired object of value may be dispensed by the apparatus as a reward for returning the shopping cart 27 to the storage region 42.

In the exemplary first form of the invention illustrated, the operating key means 28 comprises a disk-shaped member 43 lying in a vertical plane and carried by a transversely directed rod 44 which is provided with attachment means 45 at one end thereof for attaching same to a side portion of the shopping cart 27 whereby to project laterally therefrom in a manner such as to be capable of being passed through the entry and exit aperture means 29 and 32 and along the intervening track means 31 of the housing means 22 in the manner described above.

In the exemplary first form of the invention illustrated, the near wall 46 of the housing means 22 has a longitudinal side slot means 47 which allows the transverse rod 44 mounting the vertical disk 43 of the operating key means 28 to pass longitudinally along the length of the housing means 22 in the manner described above.

In the exemplary first form of the invention illustrated, the above-mentioned unlocking means 35 comprises first and second forcibly movably mounted elements, as indicated at 48 and 49, with said first element comprising a resilient spring member carried by a mounting pin 51 comprising a bolt, and with said second element comprising a flat vertically oriented planar element 49 pivotally mounted on a horizontal pivot pin 52.

Each of said elements 48 and 49 is adapted to be forcibly downwardly moved in the manner best shown in sequence in FIGS. 4, 5, and 6, by the operating key means 28 as it passes along the longitudinal track means 31. This is normally adapted to be done in a sequential manner such as to cause said unlocking means 35 to sequentially move into unlocking relationship, with said first element 48 moving downwardly first as a result of abutment of the extended end portion 44 of the horizontal rod of the operating key means 28 and with said second movable element 49 being then moved by abutment of said disk-shaped member 43 of said operating key means 28 with the top surface of said second element 49 of said unlocking means 35. This is shown in sequence in FIGS. 4, 5, and 6.

It should be clearly understood that the actuation of the first element 48 of said unlocking means 35 by the rod 44 is shown near the beginning of such actuation by the broken line or phantom line position of the operating key means 28 in FIG. 4 and is shown in succeeding actuated positions by the solid line showings of said operating key means 28 in FIGS. 5 and 6. It is absolutely essential that this occur first, since downward movement of the spring member 48 causes a bottom portion 48B thereof to move slightly downwardly whereby to abut a cam means 53 and be forced outwardly away from said second element 49 in a manner such that a laterally directed projection 54 carried by said lower portion 48B is effectively retracted from a catch means 55 (comprising an oversize lateral aperture) in said second element 49 in said unlocking means.

In other words, prior to the forcible downward movement of said operating member 48, the projection 54 engages the catch 55 and prevents substantially downward actuation of said second element 49 of said unlocking means 35. However, after such downward deflection of said first element 48 of said unlocking means 35 by the extended rod 44 of the operating key means 28 in the manner clearly shown in FIGS. 5 and 11, then said second element 49 of said unlocking means 35 is free for actuation by the vertical disk member 43 of the operating key means 28 in the manner clearly shown in FIG. 5.

When the above occurs, said second element 49 of said unlocking means 35 causes the retraction of said locking means 36 from the locked position shown in FIG. 4 into the unlocked position shown in FIGS. 5, 7, and 8, so that the extended rod 44 of the operatnig key means 28 can abut the actuating member 56 of the controllably operable dispensing means, indicated generally at 37, whereby to move it from the initial position best shown in FIG. 7 to the actuated position best shown in solid lines in FIG. 8, after which said rod 44 released said actuating member 56 and allows it to return, under spring action, to its initial position as shown in broken lines in FIG. 8. This operates the dispenser means 37 whereby to dispense any of the plurality of gum balls 38 carried in the storing means 57 so that the dispensed gum ball 38 will pass out the discharge chute 39 to the exterior removal tray 41 as pointed out hereinbefore.

It should be noted that the above-described action occurs by reason of the coupling of said second element 49 of said unlocking means 35 with respect to said locking means 36 by coupling means, indicated generally at 58, which is normally spring biased into the locked relationship mentioned above.

In the exemplary first form of the invention illustrated, said coupling means 58 comprises a lateral projection 59 connected to a recess or aperture 61 in said second element 49 of said unlocking means 35 and having a downwardly extending portion 62 connected by a transverse portion 63 to an upwardly extending projecting stop pin member portion 64 which is slidably mounted in an aperture 65 in the rim portion 66 of the controllably operable dispenser means 37 and in a position immediately in front of the actuating member 56 whereby to normally prevent it from being operated in a dispensing manner.

The locking means 36 is effectively provided with biasing spring means 67 which normally biases it upwardly in the manner described above except when forcibly downwardly moved into unlocked relationship as is shown in phantom or broken lines in FIG. 3 as a result of forcible downward actuation of said second element 49 of said unlocking means 35 in the manner best shown in FIG. 5.

It should be noted that the extended portion of said transverse rod 44 of the operating key means 28 may be said to effectively comprise dispenser operating means since it actually operates the controllably operable dispenser means 37.

It should further be noted that said rod 44 holds the first element 48 of the unlocking means 35 in the actuated downwardly deflected relationship shown in FIGS. 5 and 6 until after the disk-shaped portion 43 of said operating key means 28 has released said second element 49 of said unlocking means 35 and allowed it to be returned upwardly under the action of the biasing spring means 67 as is clearly shown in FIG. 6. Then, and only then, does said extended rod portion 44 of said operating key means 28 pass off of the left end of said first element 48 of said unlocking means 35 as is shown just about to occur in FIG. 6, after which said first element 48 will return to its former and upper pre-actuation position such as is shown in solid lines in FIG. 4. This will, of course, return the lower portion 48B of said element 48 to its upper position with the lateral projection 54 fully engaged within the catch 55 which will act to prevent any subsequent direct unauthorized attempt to downwardly deflect said second element 49 of the unlocking means 35 unless said first element 48 has been first forcibly downwardly moved whereby to release the lateral projection 54 from the catch 55 in the manner described hereinbefore.

In the exemplary first form of the invention illustrated, the hereinbefore-mentioned pair of longitudinal wheel-guiding channel means 25 are shown as fixed to the underlying platform means 24, which may be made of a large panel of metal, although not specifically so limited. This mounting of the wheel-guiding channel members 25 to the panel 24 may be by welding or by mechanical fasteners or by any other suitable means. Preferably, the panel 24 has a bevelled edge, as indicated at 68, whereby to avoid an abrupt discontinuity between the top surface of the panel 24 and an adjacent underlying ground surface as indicated at 69.

It should also be noted that, in the exemplary first form of the invention illustrated, the hereinbefore-mentioned upright mounting standard means 23 is preferably firmly attached (although preferably interchangeably attached) by attachment means, as indicated generally at 71, with respect to the panel 24 in a proper predetermined fixed relationship relative thereto and relative to the longitudinal wheel-guiding channel members 25 carried thereby.

In certain forms of the invention the upright standard means 23 may be of a predetermined height. However, in the exemplary form illustrated said upright mounting standard means 23 is provided with vertical adjustment means indicated generally at 72 for making it possible to adjust the effective height of the housing means 22 above the wheel-guiding means 25. In the exemplary form illustrated, said vertical adjustment means 72 takes the form of a plurality of apertures 73 in the upper standard portion 74 and a transverse mounting member 75 provided with a threaded screw 76 adapted to be connected thereto while passing through any selected one of the transverse apertures 73, thus having the effect of varying the over-all height of the housing means 22 above the platform means 24 and the wheel-guiding members 25.

Obviously, this would also correspondingly alter the height of the entry and exit aperture means 29 and 32 and the intervening longitudinal track means 31 for cooperation with a correspondingly height-adjusted operating key means 28 carried by a different set of shopping carts than that to which the one shown at 27 belongs. This would make it possible for several different markets located adjacent to the same parking area to use the apparatus of the present invention for retrieval of their own set of shopping carts only. This would require that each such market place all of the operating means 28 on its set of carts 27 at a different height from those of the other markets in the area and would also require that its housing means 22 be placed at a correspondingly different height by operation of the vertical adjustment means 72. Thus the carts belonging to any particular market could be easily rolled past the housing means 22 with the operating key means 28 cooperating therewith in the manner described hereinbefore for releasing a gum ball while none of the carts belonging to the other markets could cooperate with the particular housing means 22 just referred to. In other words, this would separate the various sets of shopping carts and require that they be returned to the proper shopping cart storage station if a gum ball is to be dispensed.

Incidentally, it should be noted that the housing means 22 has an upper cover means C which is hingedly attached by hinge means H positioned opposite to the slot means 47 and which is adapted to be locked in the closed relationship shown in solid lines in FIGS. 1 and 2 by the lock means L which is adapted to be locked and unlocked, when desired, by key means such as shown in phantom at K in FIG. 7. This allows access to be had to the storing means 57 of the dispenser means 37 so that the gum balls 38 can be replaced when desired.

FIG. 12 illustrates a slight modification of the invention, with all parts of the invention corresponding to the form thereof shown in FIGS. 1–11 being indicated by the same reference numerals, primed, however. The only change in this showing of the invention is the addition thereto of what might be termed an activation and inactivation means, such as is generally indicated at 77, positioned in the same plane as the transverse slot means 47' of the housing means 22' for lateral movement in a transverse plane from a normal position extending thereacross into a deflected position laterally displaced therefrom.

When said activation and inactivation means 77 is in its normal position extending across said slot means 47' and across the longitudinal track means 31' as is shown in solid lines in FIG. 12, it prevents the operating key means 28 from moving any further in a forward direction along the longitudinal track means 31', thus preventing unauthorized operation of the apparatus. However, when an authorized operating key means 28' is inserted into the longitudinal track means and moves into a position where it is laterally adjacent to the very strong permanent magnet means 78 carried at the rear end of the activation and inactivation means 77, which is pivotally mounted as indicated at 79, the disk-shaped member 43' of the authorized operating key means 28' (which is made either of a ferromagnetic material of very high permeability or which comprises a very strong permanent magnet properly polarized) exerts a very strong attraction on said very strong permanent magnet 78 whereby to draw it toward said disk-shaped member 43' against the action of a biasing spring means 81 (the tension of which can be adjusted by threaded turnbuckle means 82) whereby to laterally displace the forward stop end portion 83 of said activation and inactivation means 77 out of the path of travel of said operating key means 28', thus allowing it to proceed with the unlocking operation of the locking means in the manner described hereinbefore.

It should be clearly noted that this particular type of activation and inactivation control means as illustrated at 77 is exemplary only and is not intended to limit the invention to the precise details thereof. Actually, various functionally equivalent structures may be employed in lieu thereof.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A dispenser operable in response to movement of a vehicle in a predetermined manner, comprising operating key means cooperable for attachment with respect to a vehicle in a predetermined projecting position with respect thereto; housing means provided with receiver means positioned for the reception of said projecting operating key means as said vehicle is moved in a predetermined manner with respect to said housing means and said receiver means; storing means and controllably operable dispensing means therefor carried by said housing means and provided with locking means normally locking said controllably operable dispensing means whereby to prevent it from dispensing operation; unlocking means effectively coupleable with respect to said locking means and movably positioned adjacent to said receiver means for unlocking operation of said unlocking means, and said locking means coupleable with respect thereto, in response to the reception of said operating key means by said receiver means; said operating key means being provided with dispenser operating means cooperable with said controllably operable dispensing means for forcible dispensing operation thereof after the unlocking operation of said unlocking means, and said locking means coupleable thereto, in response to the reception of said operating key means by said receiver means in said predetermined manner; and inactivation means effectively positioned adjacent to said receiver means and normally cooperable therewith for effectively preventing unauthorized unlocking operation of said unlocking means, but magnetically cooperable with said operating key means in response to magnetic characteristics thereof for effective deactivation of said inactivation means for allowing said unlocking operation of said unlocking means by said operating key means as it moves into and along said receiver means.

2. Apparatus as defined in claim 1, wherein said unlocking means comprises first and second movably mounted elements, with said first element locking said second element against movement until operated by said operating key means prior to operation of said second element by said operating key means, and with said first element being held by said operating key means in said unlocked relationship until after said first element returns to its actuated position, after which said first element again locks it until the next succeeding actuation.

3. Apparatus as defined in claim 1 wherein said unlocking means comprises first and second movably mounted elements, with said first element being provided with laterally directed projection means and with said second element being provided with catch means cooperable with said projection means for normally locking said second element against actuation, said first element being provided with effective cam means positioned for effective retractive cooperation with respect to said projection means thereof from said catch means of said second element in response to actuation of said first element by said operating key means whereby to free said second element for actuation by said operating key means and whereby to retain said projection means in said retracted relationship out of engagement with said catch means as said operating key means moves into said receiver means and passes said second element, thus allowing it to return to its pre-actuation position, after which the passing of said operating key means out of engagement with said first element allows it to return to its pre-actuation position with said projection means lockingly engaging said catch means of said second element.

4. Apparatus as defined in claim 1 wherein said locking means comprises projecting stop means positioned adjacent to said controllably operable dispensing means in an extending stop position for normally preventing dispensing operation thereof and effectively connected with respect to said second element of said unlocking means for effective unlocking retraction of said projecting stop means when said second element of said unlocking means is actuated by said operating key means, thus freeing said dispensing means for immediately succeeding dispensing operation by said operating key means as it moves into said receiver means.

5. Apparatus as defined in claim 1, wherein said locking means comprises projecting stop means positioned adjacent to said controllably operable dispensing means in an extending stop position for normally preventing dispensing operation thereof and effectively connected with respect to said second element of said unlocking means for effective unlocking retraction of said projecting stop means when said second element of said unlocking means is actuated by said operating key means, thus freeing said dispensing means for immediately succeeding dispensing operation by said operating key means as it moves into said receiver means, said locking projecting stop means being provided with spring biasing means normally biasing it into said extending stop position with respect to said dispensing means.

6. Apparatus as defined in claim 1 including wheel guide means cooperable with the underlying wheel means of said vehicle and adapted to be positioned in a predetermined relationship with respect to said receiver means carried by said housing means for guiding said vehicle in a predetermined manner with respect to said housing means and said receiver means with said operating key means aligned with said receiver means.

7. Apparatus as defined in claim 1 including wheel guide means cooperable with the underlying wheel means of said vehicle and adapted to be positioned in a predetermined relationship with respect to said receiver means carried by said housing means for guiding said vehicle in a predetermined manner with respect to said housing means and said receiver means with said operating key means aligned with said receiver means, said wheel guide means being carried by a substantially horizontal platform means spacedly positioned below said housing means in a predetermined relationship with respect to said receiver means and vertically separated therefrom by a predetermined distance.

8. Apparatus as defined in claim 1 including wheel guide means cooperable with the underlying wheel means of said vehicle and adapted to be positioned in a predetermined relationship with respect to said receiver means carried by said housing means for guiding said vehicle in a predetermined manner with respect to said housing means and said receiver means with said operating key means aligned with said receiver means, said wheel guide means being carried by a substantially horizontal platform means spacedly positioned below said housing means in a predetermined relationship with respect to said receiver means and vertically separated therefrom by a predetermined distance, said housing means being provided with controllably vertically adjustable mounting standard means fixedly mounting said housing means above said underlying platform means at any of several different predetermined heights corresponding to the predetermined height of the corresponding operating key means carried by any of a plurality of vehicles.

9. A dispenser operable in response to movement of a shopping cart into a storage region, comprising: operating key means provided with attachment means cooperable for attachment with respect to a shopping cart in a laterally projecting position with respect thereto; housing means provided with receiver means comprising longitudinal track means extending therethrough and having entry and exit aperture defining means longitudinally aligned with opposite ends of said longitudinal track means, and additionally having transverse entry slot means extending along the length of one side of said housing means for the reception of said laterally directed operating key means for movement into said entry aperture means, along the length of said longitudinal track means, and out of said exit aperture means as said shopping cart is longitudinally moved past said housing means toward a selected shopping cart storing region; gift storing means and controllably operable dispensing means therefor carried by said housing means adjacent to said longitudinal track means and effectively provided with locking means and spring biasing means normally locking said controllably operable dispensing means whereby to prevent it from dispensing operation; unlocking means effectively coupled with respect to said locking means and movably positioned adjacent to said longitudinal track means for abutment by and unlocking operation of said unlocking means, and said locking means coupled thereto, by said operating key means as it passes longitudinally through said housing means along said longitudinal track means from said entry aperture means toward said exit aperture means; said operating key means being provided with said controllably operable dispensing means for forcible dispensing operation thereof as said operating key means passes longitudinally through said housing means along said longitudinal track means from said entry aperture means toward said exit aperture means; inactivation means effectively positioned adjacent to said longitudinal track means and normally cooperable for preventing the unauthorized passage of said operating key means along said longitudinal track means and thereby preventing unauthorized actuation of said unlocking means, but cooperable with said operating key means for deactivation of said inactivation means by moving same out of the path of travel of said operating key means for subsequently allowing said unlocking operation of said unlocking means by said operating key means as it moves along said longitudinal track means, said inactivation means comprising stop means cooperable for preventing movement of said operating key means along said longitudinal track means beyond a predetermined location and having a magnetic portion magnetically cooperable with respect to said operating key means for deactivation thereby to move out of said stopping relationship with respect to said operating key means in response to magnetic characteristics of said operating key means.

10. Apparatus as defined in claim 9 wherein said unlocking means comprises first and second movably mounted elements, with said first element locking said second element against movement until operated by said operating key means prior to operation of said second element by said operating key means, and with said first element being held by said operating key means in said unlocked relationship until after said first element returns to its unactuated position, after which said first element again locks it until the next succeeding actuation.

11

11. Apparatus as defined in claim 9 wherein said unlocking means comprises first and second movably mounted elements, with said first element being provided with laterally directed projection means and with said second element being provided with catch means cooperable with said projection means for normally locking said second element against actuation, said first element being provided with effective cam means positioned for effective retractive cooperation with respect to said projection means thereof from said catch means of said second element in response to actuation of said first element by said operating key means whereby to free said second element for actuation by said operating key means and whereby to retain said projection means in said retracted relationship out of engagement with said catch means as said operating key means moves along said longitudinal track means and passes said second element, thus allowing it to return to its preactuation position, after which the passing of said operating key means out of engagement with said first element allows it to return to its pre-actuation position with said projection means lockingly engaging said catch means of said second element.

12. Apparatus as defined in claim 9 wherein said locking means comprises upwardly projecting stop pin means positioned adjacent to said controllably operable dispensing means in upwardly extending stop position for normally preventing dispensing operation thereof and effectively connected with respect to said second element of said unlocking means for effective unlocking downward retraction of said upwardly projecting stop pin means when said second element of said unlocking means is actuated by said operating key means, thus freeing said dispensing means for immediately succeeding dispensing operation by said operating key means as it moves along said longitudinal track means.

13. Apparatus as defined in claim 9 including a pair of laterally spaced longitudinal wheel guide means cooperable with underlying wheel means of said shopping cart and positioned in a predetermined longitudinal parallel relationship with respect to said longitudinal track means of said housing means for guiding said shopping cart in a predetermined passing relationship with respect to said housing means and said longitudinal track means with said operating key means aligned with said entry aperture means, said longitudinal track means, and said exit aperture means.

14. Apparatus as defined in claim 9 including a pair of laterally spaced longitudinal wheel guide means cooperable with underlying wheel means of said shopping cart and positioned in a predetermined longitudinal parallel relationship with respect to said longitudinal track means of said housing means for guiding said shopping cart in a predetermined passing relationship with respect to said housing means and said longitudinal track means with said operating key means aligned with said entry aperture means, said longitudinal track means, and said exit aperture means, said pair of parallel longitudinally directed wheel guide means being carried by a substantially horizontal underlying platform means spacedly positioned below said housing means parallel to said longitudinal track means thereof and vertically separated therefrom by a predetermined distance.

15. Apparatus as defined in claim 9 including a pair of laterally spaced longitudinal wheel guide means cooperable with underlying wheel means of said shopping cart and positioned in a predetermined longitudinal parallel relationship with respect to said longitudinal track means of said housing means for guiding said shopping cart in a predetermined passing relationship with respect to said housing means and said longitudinal track means with said operating key means aligned with said entry aperture means, said longitudinal track means, and said exit aperture means, said pair of parallel longitudinally directed wheel guide means being carried by a substantially horizontal underlying platform means spacedly positioned below said housing means parallel to said longitudinal track means thereof and vertically separated therefrom by a predetermined distance, said housing means being provided with controllably vertically adjustable mounting standard means fixedly mounting said housing means above said underlying platform means at any of several different predetermined heights corresponding to the predetermined height of the corresponding operating key means carried by any of a plurality of vehicles.

References Cited by the Examiner
UNITED STATES PATENTS

| | | | |
|---|---|---|---|
| 1,987,835 | 1/35 | Love | 194—4 |
| 2,753,970 | 7/56 | Breeler | 194—4 |
| 2,818,955 | 1/58 | Stackhouse | 194—4 |

SAMUEL F. COLEMAN, *Primary Examiner.*
ROBERT B. REEVES, *Examiner.*